June 21, 1949.  E. ROBERTS  2,473,767
PLURAL LENS CAMERA

Filed June 27, 1947  2 Sheets—Sheet 1

Inventor
Earl Roberts
By Randolph & Beavers
Attorneys

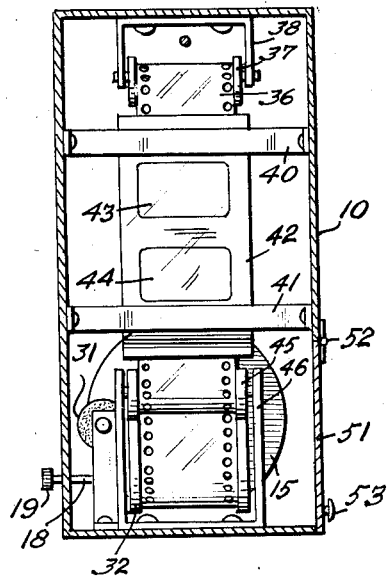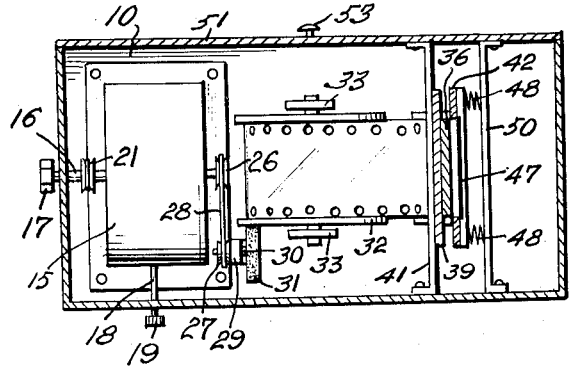

Patented June 21, 1949

2,473,767

UNITED STATES PATENT OFFICE 2,473,767

PLURAL LENS CAMERA

Earl Roberts, Easton, Pa.

Application June 27, 1947, Serial No. 757,405

1 Claim. (Cl. 88—16.6)

The present invention relates to a camera and it consists in the combinations, constructions and arrangements of parts herein described and claimed.

It is an object of the invention to provide a camera which will produce a negative which, when developed and printed, will allow a projector to cast images of apparently three dimensional scope.

Another object of the invention is the provision of a camera having a novel arrangement of lenses.

A further object of the invention is the provision of a camera having means for exposing two frames at a time upon a continuous film strip.

Another object of the invention is the provision of a camera having novel means and mechanism for the repeated simultaneous exposure of two frames of film strip wherein one exposure is slightly offset from the next.

Other and further objects of the invention will become apparent from a reading of the following specification taken in conjunction with the drawing, in which:

Figure 3 is a sectional view taken along line 3—3 of Figure 2,

Figure 4 is a sectional view taken along line 4—4 of Figure 2, and

Figure 1:
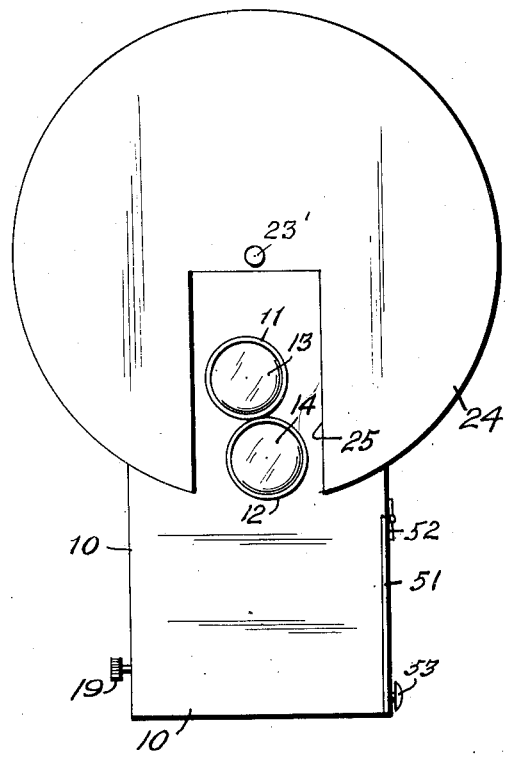
Figure 1 is a front elevational view of an embodiment of the invention.
Figure 5:
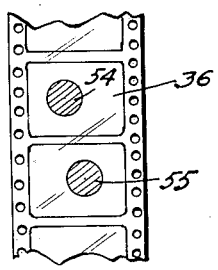
Figure 5 is a fragmentary plan view of an exposed film strip utilized in the invention.
Figure 2:
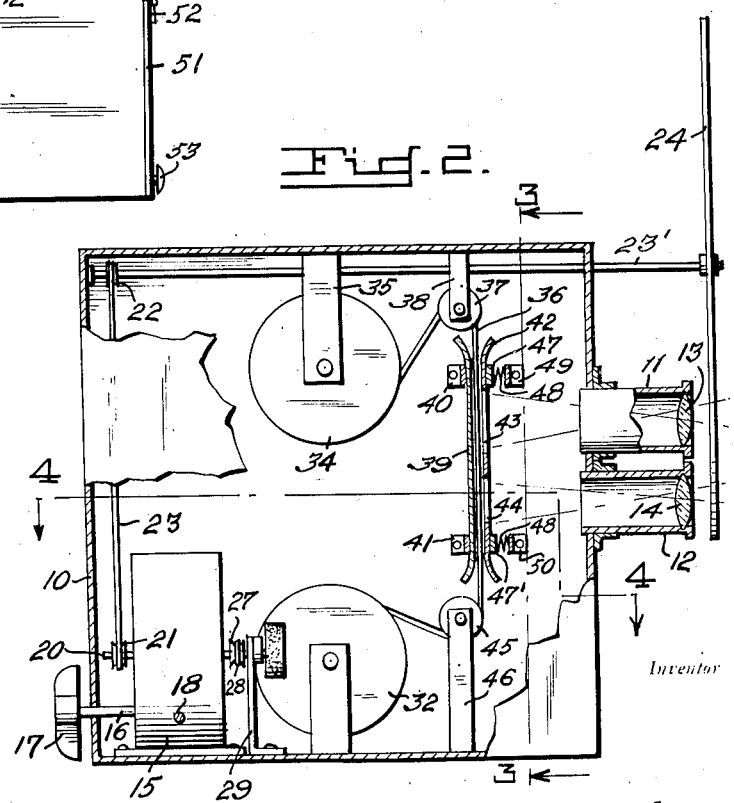
Figure 2 is a side elevational view, partly broken away, of Figure 1.

Generally, the invention comprises a camera having a pair of lenses, one mounted above but slightly to one side of the other and each adapted to cast a separate image through a separate frame upon a film strip at the same time. A spring motor is provided in the camera housing for moving the film from an unexposed reel to an exposed reel and also to operate a light gate for the lenses. The printed copies of film so produced may be projected in a conventional manner to give the illusion of depth.

Referring more particularly to the drawings, there is shown therein a camera having a housing 10 in the front wall of which is provided a pair of lens casings 11 and 12 in which is mounted a pair of lenses 13 and 14, respectively.

Within the housing there is provided a spring motor 15 having a winding shaft 16 extending through the rear wall of the housing and terminating in an operating handle 17. A start and stop control shaft 18 protrudes from the motor through one side of the housing and terminates in a button 19. The motor is of the intermittent type, that is to say, motion is imparted to its drive shaft 20 intermittently in a conventional manner.

At the rear end of the shaft 20 there is provided a pulley 21 which is interconnected with a pulley 22 by means of a belt 23. The pulley 22 is mounted upon a light gate shaft horizontally extending along the underside of the top of the housing 10 and extending outwardly of the housing and terminating in a light gate 24 having a light slot 25 therein. The forward end of the shaft carries a pulley 26 which is interconnected with a pulley 27 by means of a belt 28.

The pulley 27 is mounted upon a shaft 30 carried by a bracket 29 which is affixed to the bottom of the housing and the forward end of the shaft 30 has mounted thereon a roller 31 having a roughened periphery for frictional engagement with one side of an exposed film reel 32 carried in a bracket 33 affixed to the bottom of the housing 10.

An unexposed film reel 34 is carried by a bracket 35 affixed to the top of the housing 10 and a film strip 36 is adapted to run from the reel 24 over an idler pulley 37 carried by a bracket 38 affixed to the top of the housing and thence downwardly between a fixed guide member 39 carried by a pair of laterally extending brackets 40 and 41 affixed to the sides of the housing and a yieldable guide and frame member 42 having openings 43 and 44 therein, thence over an idler 45 mounted upon a bracket 46 affixed to the bottom of the housing and thence to the reel 32.

The member 42 is carried by a pair of laterally extending arms 46 and 47 having springs 48 connecting the same with laterally extending brackets 49 and 50 affixed to the sides of the housing 10.

A door 51 is hinged as indicated at 52 in one side of the housing 10 and is provided with a knob 53.

In operation, it will be seen that upon pressing the button 19, that the film will be intermittently fed from the reel 34 to the reel 32 by means of the motor 15, the pulleys 26 and 27, the belt 28 and the roller 31. As the film moves between the guide 39 and the member 42, two portions of the same will be exposed in the openings 43 and 44. At the same time, the light slot 25 will come into registry with the lenses 13 and 14 and allow images therefrom to be thrown upon the exposed portions of the film in an offset manner with respect to each other, as shown at 54 and 55, respectively.

After the exposed film is removed from the camera through the door 51 and developed and printed in the customary manner, the printed film may be projected in the conventional manner but with twice the ordinary speed. For example, if the camera has exposed the film at the rate of sixteen exposures per second, a total of thirty-two frames will have been exposed thereon. In projecting the printed film in such case, the projector would be run at the rate of thirty-two frames per second. The eye of the observer will see the successive offset images upon a screen alternately and the retina of the eye will retain each previous image through persistence of vision, thereby giving the observer the effect of depth or apparent three dimensional pictures.

While but one form of the invention has been shown and described herein, it will be readily apparent to those skilled in the art that many minor modifications may be made herein without departing from the spirit of the invention or the scope of the appended claim.

What is claimed is:

A device of the character described comprising a camera casing, a pair of reels mounted to carry film mounted in the casing, a lens mounted in the front wall of the casing, a second lens mounted in the front wall of the casing above and to one side of the first mentioned lens, a shutter adapted to cooperate with the lens and film to expose the film in pairs of successive frames, an intermittent motor, a disc at one side of one of the reels, said motor being provided with a shaft, a friction roll in driving engagement with the disc and adapted to cause the film to move a distance of two frames at each intermittent movement of the motor, a drive connection between the motor shaft and the drive roll, an elongated shaft extending from within the casing to a point beyond the front wall thereof and carrying said shutter, a drive connection between the motor shaft and the elongated shaft and means for starting and stopping said motor.

EARL ROBERTS.

REFERENCES CITED

The following references are of record in the file of this patent:

UNITED STATES PATENTS

| Number | Name | Date |
| --- | --- | --- |
| 1,163,549 | Leonard | Dec. 7, 1915 |
| 1,258,226 | Kamowski | Mar. 5, 1918 |
| 1,291,954 | Losey | Jan. 21, 1919 |
| 1,619,949 | Mannes et al. | Mar. 8, 1927 |
| 1,814,672 | Dupont | July 14, 1931 |
| 1,949,339 | Thomas | Feb. 27, 1934 |

FOREIGN PATENTS

| Number | Country | Date |
| --- | --- | --- |
| 545,910 | France | Aug. 4, 1922 |
| 446,165 | Great Britain | Aug. 27, 1936 |